May 3, 1960   C. A. M. TAYLER   2,934,910
CONVERTER FOR LIQUEFIED GASES
Filed June 20, 1958
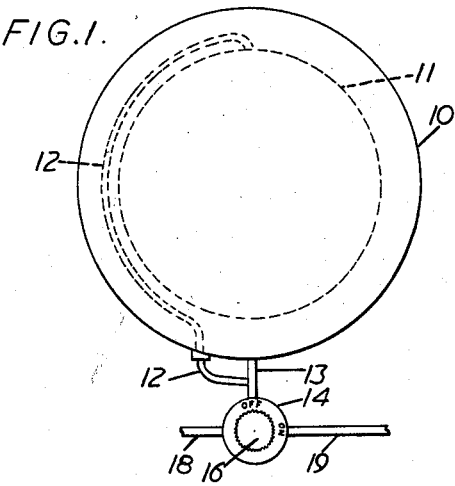
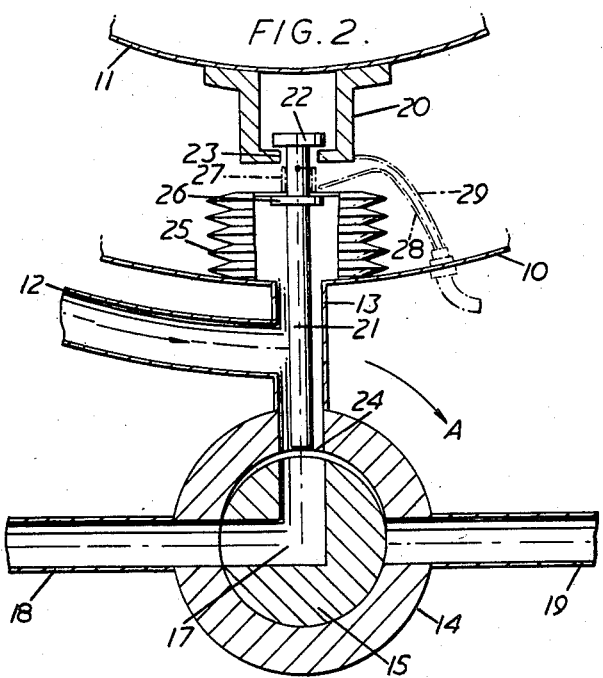
Inventor
COLIN ANDREW MILLAR TAYLER
By
Aaron R. Townshend   Attorney

United States Patent Office 2,934,910
Patented May 3, 1960

2,934,910

CONVERTER FOR LIQUEFIED GASES

Colin Andrew Millar Tayler, Harlow, England, assignor to The British Oxygen Company Limited, a British company Application June 20, 1958, Serial No. 743,433

Claims priority, application Great Britain July 9, 1957

5 Claims. (Cl. 62—50)

This invention relates to converters for liquefied gases, of the kind in which liquid gas is stored in an insulated container and is drawn off as required for consumption in the gaseous phase.

In prior converter systems it has been usual to provide a pressure build-up circuit which included a coil in which liquid gas was evaporated to generate gas for feeding to the container via a pressure-actuated closing valve so as to pressurize the container to a required degree, the pressure forcing liquid gas on demand into an evaporating circuit for supply and consumption. A further arrangement designed to reduce evaporation loss consisted of an economiser circuit, the function of which was to vent the gas phase of the container into the evaporating circuit under excess pressure conditions, to supplement the supply, rather than waste gas by venting the container to atmosphere through a relief valve.

It will be appreciated from the foregoing that converter equipment has hitherto been somewhat complicated, comprising several distinct circuits, evaporators, and associated valves and tubing. It will also be appreciated that simplification of manufacture and reduction of the quantity and weight of the converter equipment are important advantages, particularly with regard to portable equipment for industrial or medical use and equipment for aircraft use, and it is the object of the present invention to provide a liquid gas converter in which these advantages are obtained.

According to the present invention a heat-conductive bridge is provided between the inner wall of an insulated liquid gas container and the ambient atmosphere for conducting heat inwardly to the inner wall and vaporising the liquid gas, said bridge comprising at least two parts which are relatively movable out of contact with each other to break the bridge, and means being provided for effecting relative movements of said parts to break or complete the bridge.

An element may be provided which is responsive to pressure generated by vaporisation of the liquid gas, said element being adapted to break the bridge automatically when the pressure of the vaporised gas reaches a predetermined value.

A manual control may be provided for effecting breaking or completion of the bridge, whereby the converter equipment can be rendered inoperative e.g. during periods of non-use. This manual control can conveniently be combined with a manually-operated valve which either places a gas delivery conduit in communication with the gas phase of the converter at the same time as the manual control causes the bridge to be completed, or cuts off communication between said delivery conduit and the gas phase of the converter and connects the gas phase to a vent conduit at the same time as the manual control causes the bridge to be broken.

The heat-conductive bridge may have a source of heat associated therewith for augmenting the flow of heat to the inner wall through the bridge when the latter is completed. In this connection the source of heat may be an electric heater, the power supply circuit of which is closed only when the bridge is completed.

An embodiment of the invention will now be described with reference to the accompanying drawings in which:

Fig. 1 is a diagrammatic representation of a converter constructed in accordance with the invention.

Fig. 2 is a diagrammatic sectional detail view, showing the heat-conductive bridge mechanism.

Referring to Fig. 1 of the drawings, the converter illustrated comprises an outer spherical shell or wall 10, preferably of metal, and an inner spherical shell or wall 11 in which liquid gas is stored. No attempt is made in the drawing to show how the inner wall 11 is mounted within the outer wall 10, since such features form no part of the present invention. The space between the two walls is preferably evacuated to provide heat insulation, but the invention is also applicable to an arrangement in which the space contains heat-insulating material, or in which a single inner shell or wall carries a thick covering of heat-insulating material.

A conduit 12 is connected to the top of the inner wall 11, and it extends through the space between the walls 10 and 11 to the region of the base of the converter, before passing in gas-tight manner through the outer wall 10 to join up with a conduit 13 which depends from the outer wall 10. The conduit 12 is, of course, in communication with the gas phase within the inner-wall 11 which exists above the level of liquid gas therein, and the conduit 13 with which the conduit 12 connects has its lower end secured to a valve casing 14.

Referring also to Fig. 2 of the drawings, in which like numerals indicate like parts to those already referred to in connection with Fig. 1, the valve casing 14 houses a rotary valve cock 15 which can be turned by the handle indicated at 16 in Fig. 1. The valve cock 15 can be turned between two limit positions through 90° of movement, and one of these positions is shown in Fig. 1, in which an L-shaped passage 17 in the valve cock 15 in connecting the conduits 13 and 12 with a vent conduit 18. The other limit position of the valve cock 15 is reached by turning it through 90° in the direction of the arrow A in Fig. 2, whereupon the passage 17 is connecting the pipe 13 with a delivery conduit 19 leading to a point of consumption of gas.

Secured to the outer surface of the inner wall 11 is a metallic seat member 20, e.g. of copper, and co-acting with said seat member 20 is the upper end of a metallic rod 21, which may also be of copper, having an enlarged flat head 22. The rod 21 passes through a clearance hole 23 in the seat member 20, and by vertical movement of the rod 21 the head 22 can be caused either to engage the seat member 20 or to lift out of engagement therewith, as shown in Fig. 2.

The rod 21 has a lower portion disposed co-axially within the pipe 13, and its lower extremity rests on the periphery of the valve cock 15, the latter being provided with a cam 24 which acts to raise the head 22 of the rod 21 out of contact with the seat member 20. When the valve cock 15 is turned to its other limit position, however, the cam 24 moves from beneath the rod 21 and the head 22 descends into contact with the seat member 20, the lower extremity of the rod 21 still remaining in contact with the valve cock 15. Under these latter conditions a heat-conductive path is established between the inner wall 11 and the ambient atmosphere via the seat member 20, the rod 21, the valve cock 15 and the valve casing 14.

The rod 21 and seat member 20 functions as two parts of a heat-conductive bridge which can be broken or completed by relative movement of said parts.

The head 22 of the rod member 21 could be conical, if desired, to engage a complementary surface on the seat member 20 for maximum area of contact.

It will be noted that when the valve cock 15 is in the position in which the conduits 12 and 13 are connected to the vent pipe 18, the heat-conductive bridge is broken, and no gas is evaporated within the inner wall 11 by heat inleak, but when the valve cock 15 is positioned to connect the conduits 12 and 13 with the delivery conduit 19 the heat-conductive bridge is completed and evaporation of liquid gas commences.

Mounted on the inner wall of the outer shell 10, so as to encompass the rod 21, is a flexible pressure-sensitive capsule 25 of bellows type, the interior of which is in constant communication with the pipe 13 through which evaporated gas passes from the gaseous phase of the interior of the converter to the supply conduit 19. As gas is evaporated in excess of the rate of flow required in the supply conduit 12, pressure builds up in the conduits and also in the capsule 25, so that the latter is expanded. The upper end of the capsule 25 is secured to the rod 21 at 26, so that when the capsule is expanded by a certain amount, corresponding to a predetermined gas pressure, the rod 21 will be raised and the heat-conductive bridge will be broken until such time as the pressure drops sufficiently to allow the capsule 25 to contract and the bridge to be completed.

An added refinement for augmenting the heat input when the bridge is completed is indicated by an electric heater coil 27, shown in chain-dot lines as surrounding the rod 21 above the upper end of the capsule 25. A flexible electric lead 28 is connected to one end of the coil 27, the other end of which is electrically connected to the rod 21. The other lead 29 is connected to the seat member 20, and the two leads pass through the outer shell 10 for connection to a power supply (not shown). When the head of the rod 22 contacts the seat member 20 the circuit through the heater coil 27 is completed, i.e. when the bridge is completed, but the circuit is broken when the bridge is broken, as shown in Fig. 2.

With the present invention a construction can be attained which shows a considerable simplification and economy of apparatus over converter equipment known hitherto.

It will be appreciated that the particular construction above described is merely by way of example, and that other arrangements are envisaged which embody the principle of providing a breakable heat-conductive bridge across the insulation of a liquid gas container to effect evaporation of liquid gas with the container. There are also many alternative ways of providing a pressure-responsive element which completes and breaks the bridge in accordance with the demand for gas.

What I claim is:

1. In a converter for liquefied gas having an inner shell enclosed by heat insulation and conduit means connecting with the vaporized gas space within said shell for delivery of gas therefrom, the combination of at least two separate co-acting parts which together form a breakable heat-conductive bridge across said insulation and provide the sole heat-conductive link between the inner shell and the ambient atmosphere for conducting heat inwardly to vaporise the liquefied gas, a fluid pressure responsive element, an operative connection between said element and a part of said bridge, and conduit means connecting said element with the vaporised gas space of said inner shell, said element operating in response to fluid pressure to move said part in a direction to break the bridge when said element is subjected to a predetermined value of fluid pressure.

2. In a converter for liquefied gas having an inner shell enclosed by heat insulation and conduit means connecting with the vaporized gas space within said shell for delivery of gas therefrom, the combination of at least two separate co-acting parts which together form a breakable heat-conductive bridge across said insulation and provide the sole heat-conductive link between the inner shell and the ambient atmosphere for conducting heat inwardly to vaporise the liquefied gas, a fluid pressure responsive element, conduit means connecting said element with said vaporised gas space, an operative connection between said element and a part of said bridge whereby said part is moved by the pressure-responsive element in direction to break the bridge when a predetermined vaporised gas pressure is attained, and a manual control element for moving one of said parts in direction to break the bridge and positively holding said part in a bridge-broken position.

3. In a converter for liquefied gas having an inner shell enclosed by heat insulation and conduit means connecting with the vaporised gas space within said shell for delivery of gas therefrom, the combination of at least two contacting parts of heat-conductive material which together form a heat-conductive bridge assembly connecting said inner shell with the ambient atmosphere, means mounting one of said parts for disengaging movement relative to an adjacent part, means for moving said one part to effect said disengaging movement and thereby break the heat-conductive condition of the bridge assembly, heating means in heat-exchange relation with said bridge assembly and means for rendering said heating means operative when the bridge assembly is in heat-conductive condition.

4. In a converter for liquefied gas having an inner shell enclosed by heat insulation and conduit means connecting with the vaporised gas space within said shell for delivery of gas therefrom, the combination of a metallic seat member secured to the outer wall of said inner shell, a metallic rod member disposed to have one end in contact with said seat member, a pressure-responsive expansible and contractible capsule supporting said rod member for movement relative to said seat member in direction to break said contact when the capsule is expanded, a connection between said gas delivery conduit means and said capsule whereby the interior of the capsule is subjected to the pressure of the vaporised gas, a valve casing disposed externally of said insulation and connected with said delivery conduit means, a gas supply conduit and a vent conduit also connected with said valve casing, a rotary valve member housed in said casing for movement between two limit positions in which it respectively connects said delivery conduit means with said gas supply conduit or with said vent conduit, said valve member being engaged by the other end of said metallic rod member whereby the seat member, the rod member, the valve member and the valve casing together provide a heat-conductive bridge assembly connecting the inner shell with the ambient atmosphere, a manual control for rotating said valve member between its limit positions, and a cam on said valve member which moves said rod member out of contact with the seat member when the valve is turned into the limit position in which it connects the gas delivery conduit means with the vent conduit.

5. In a converter for liquefied gas as claimed in claim 4, an electrical heater disposed in heat-exchange relationship with said metallic rod member and circuit means supplying electrical power to said heater, said circuit means including said seat member and said metallic rod member, whereby said circuit means supplies power to the heater only when the seat and rod members are in contact with each other.

References Cited in the file of this patent

UNITED STATES PATENTS

| 1,564,612 | Mott | Dec. 8, 1925 |
| 1,719,692 | Des Jardins | July 2, 1929 |
| 2,515,835 | Preston | July 18, 1950 |

FOREIGN PATENTS

| 102,269 | Switzerland | Nov. 11, 1922 |
| 188,899 | Germany | June 14, 1906 |